May 12, 1931.　　　　J. HOJNOWSKI　　　　1,804,832
CHILD'S VEHICLE
Filed May 29, 1930
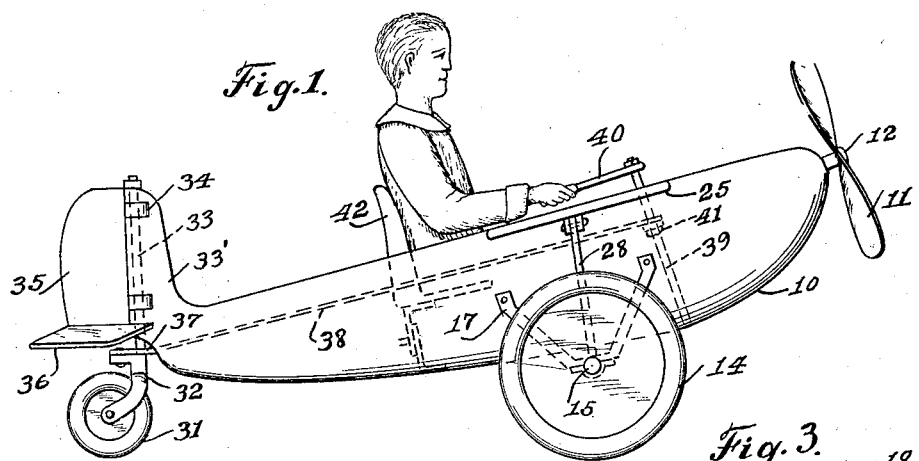
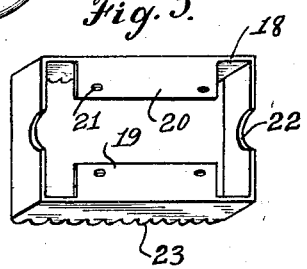
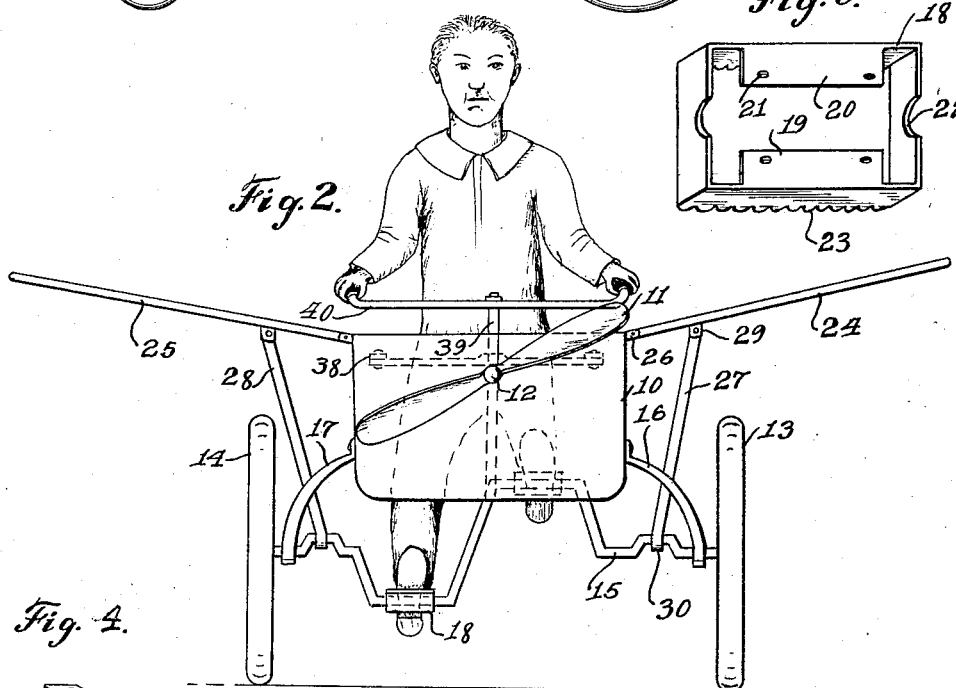
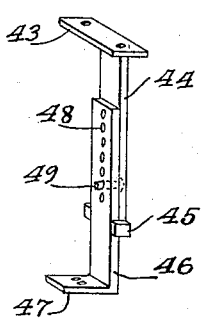
Inventor
Jakob Hojnowski
By　　Attorney Patented May 12, 1931

1,804,832

UNITED STATES PATENT OFFICE

JAKOB HOJNOWSKI, OF NEKOOSA, WISCONSIN

CHILD'S VEHICLE

Application filed May 29, 1930. Serial No. 456,926.

This invention relates to improvements in children's vehicles, and it is the principal object of my invention to provide a car having the appearance of an aeroplane propelled by the operation of pedals.

Another object of my invention is the provision of a pedal operated child's car simulating an aeroplane, being equipped with a propeller, flopping wings, and steering rudder.

A further object of my invention is the provision of a child's car equipped with an adjustable seat for the operator.

A still further object of my invention is the provision of a child's car propelled by pedals of a novel and improved construction, the handle bars of which effect the steering by a wheel the upright pin of which draws the rudder to one or the other side in simulation of the steering of an aeroplane.

These and other objects and advantages of my invention will become more fully known as the description thereof proceeds and will then be specifically defined in the appended claims.

In the accompanying drawings forming a material part of this disclosure:

Fig. 1 is a side elevation of a child's car representing an aeroplane and constructed according to my invention.

Fig. 2 is a front elevation thereof.

Fig. 3 is a detail view of a pedal on an enlarged scale.

Fig. 4 is a perspective detail view of an extension seat support.

As illustrated, the body of the car 10 has the form of an aeroplane body to the front edge of which a propeller 11 is attached, rotatable about its stub shaft 12.

The front part of the body is supported by two wheels 13 and 14 at the ends of a crank shaft or axle 15 supported in brackets 16, 17 attached to the sides of the body.

The crank shaft is rotated in the usual manner by means of pedals 18 of a construction best illustrated in Figure 3.

Each pedal consists of a frame having inwardly extending oppositely disposed plates 19, 20, integrally made therewith, each provided with suitable holes 21 for the passage of the fastening members for attaching the pedal to the axle or shaft 15, while the lower edges of the end walls of the pedals have semicircular recesses 22 for the reception of the axle and the upper edges of the side walls of the frame are serrated, as at 23.

To the side walls of the body wings 24, 25, are pivotally attached, as at 26, and are supported intermediate their ends by braces 27, 28, the upper ends of which are pivotally secured, as at 29, to the underside of the wings, while their lower ends grip about axle 15, as at 30.

The steering of the vehicle is effected by means of a small rear wheel 31 rotatably mounted between the forked ends of a bracket 32 having an upwardly extending pin 33 attached thereto guided in the tail piece 33' of the body 10 and movably held in loops 34 on a rudder 35, while a horizontal plate 36 simulating a horizontal rudder can be used as a step.

To the arm 37 of bracket 32 the ends of a cable 38 are attached which is guided about a steering post 39 extending above the body where it carries a handle bar 40 and a collar 41 on post 39 limits the downward movement of the cable, attached thereto.

The operator or child sits on a seat 42 supported by the top plate 43 of the arm 44 of an extension bracket equipped with lower guides 45 for the other arm 46 of the bracket provided with a foot 47 adapted to be secured to the bottom of the body 10. Both arms are provided with a plurality of openings 48 which when brought into alignment allow the passage of a pin or bolt 49 for locking both arms in their relative adjusted positions.

The operation and use of my device will be entirely clear from the above description in connection with the drawing, and it will be evident that I have invented a car which will greatly contribute to the amusement of children as during the pedalling of the vehicle the propeller will rotate, the wings will flop and the steering rudder will move to one side or the other all in simulation of an aeroplane. The seat can be readily adjusted to the desired suitable height by the proper adjustment of the relative position of bracket arms 44 and 46.

It will be understood that I have described and shown the preferred form of my device only and that I may make such changes therein as come within the scope of the appended claims without departure from my invention.

Having thus described my invention what I claim as new and desire to secure by Letters Patent is:

1. A pedal operated child's vehicle comprising a body simulating the body of an aeroplane, side wings pivotally attached to said body, a crank shaft, members attached to said crank shaft, and pivoted at the underside of the wings, and pedals to rotate said shaft for flopping said wings.

2. In a child's vehicle having the shape of an aeroplane, a pair of wings pivotally attached to the side walls of the vehicle, braces pivotally attached at their upper ends to the underside of said wings, a means for propelling the vehicle including crank shaft or axle, the lower ends of said braces gripping about said axle to flop the wings during the propulsion of the vehicle.

Signed at Nekoosa, in the county of Wood and State of Wisconsin, this 19th day of April, A. D. 1930.

JAKOB HOJNOWSKI.